Jan. 27, 1959     J. E. POORMAN     2,870,661

KNURLING TOOL

Filed March 12, 1956

John E. Poorman
INVENTOR

United States Patent Office 2,870,661
Patented Jan. 27, 1959

2,870,661

KNURLING TOOL

John E. Poorman, Philadelphia, Pa.

Application March 12, 1956, Serial No. 570,743

2 Claims. (Cl. 80—5.1)

The present invention relates to an improved knurling tool holder.

The primary object of the invention is to provide a knurling tool holder adapted for fitting to the tail stock or turret of a lathe, which holder is provided with a novel knurling tool adjustable mounting means for providing increased rigidity of the knurling tools relative to the work piece being knurled.

A highly important object of the invention lies in the provision of a knurling tool holder having knurling tool holding blocks swingably mounted thereon with the knurling tool mounting means of the blocks disposed in radially offset relation to the swinging axes of the blocks for individually positioning the tools relative to the work piece.

Another important object of the invention, ancillary to the preceding object, is in the provision of means for rigidly, individually fixing the tool blocks in their selected positions by a direct clamping action to minimize loosening thereof while a work piece is being knurled.

A further object of the invention is to provide a knurling tool member having means for relatively simply adjusting the knurling tools toward and away from one another utilizing a minimum number of moving parts and necessitating a minimum of expense in the manufacture thereof.

A further object of the invention is in the provision of a knurling tool holder wherein the parts thereof are readily and quickly interchangeable to adapt the holder to a wide variety of work pieces and a minimum amount of maintenance care.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts through the several figures and in which:

Figure 1:
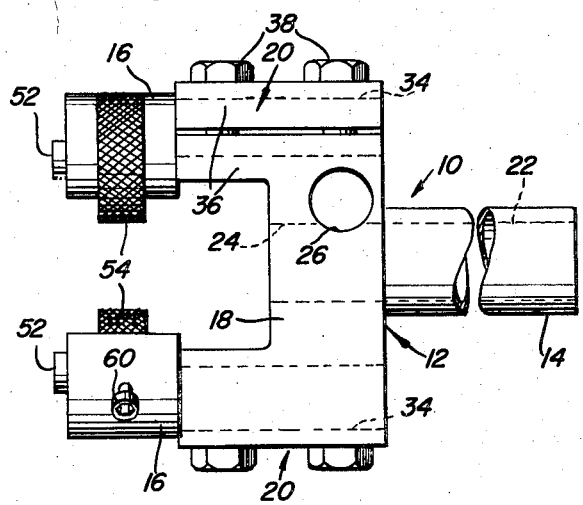
Figure 1 is a side elevational view of the knurling tool holder constituting the invention.
Figure 2:
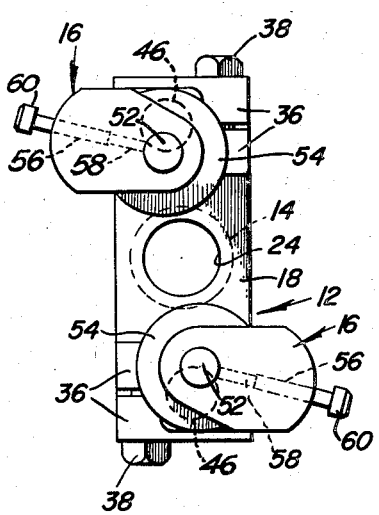
Figure 2 is a front end view of the holder.

In the drawings, the tool holder constituting the invention is designated in its entirety by the numeral 10 and comprises a tool support 12, mounting shank 14 and knurling tool carrying blocks 16.

The support 12 is in the form of a U-shaped element having a web 18 and parallel arms 20 which project forwardly from the ends thereof. The mounting shank 14 may be formed integrally with the support 12 and projects rearwardly from the central portion of the web 18 thereof. The shank 14 is tubular and the longitudinal bore 22 therethrough registers with a bore 24 through the central portion of the web 18 of the support 12. This particular formation of the mounting shank and web of the tool holding support 12 enables the holder to be fitted to the tail stock of a lathe, or to the hole in the turret of another type lathe or fitted to the spindle of a hand screw machine.

Figure 4:
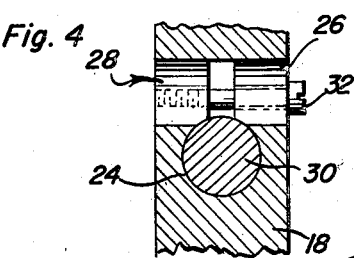
Figure 4 is a cross-sectional view through the tool support disclosing the manner in which the support is fixed to the turret or tail stock of a lathe or other machine tool.
Figure 3:
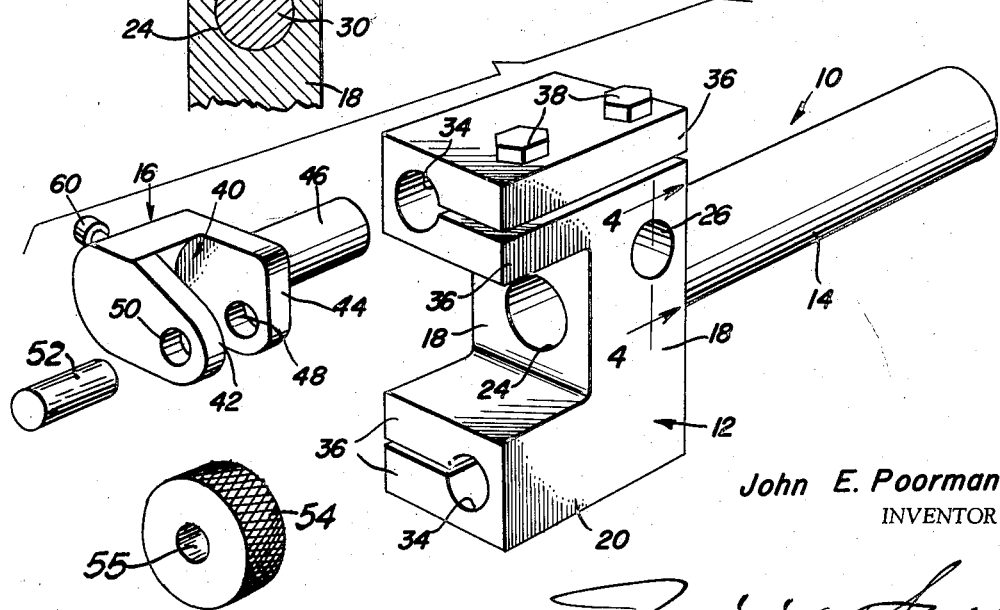
Figure 3 is a perspective view of the tool holder and one of the tool holding members disclosing the manner of their attachment to one another.

In order to fit the holder 10 to a spindle support or tail stock, the web 18 of the support 12 is provided with a transverse bore 26 which intersects the transverse bore 24 through the web of the support as will be clearly noted in Fig. 4. In this figure, a spindle 30 is shown extending into the bore 24 of the web 18 of the support 12. Disposed in the transverse bore 26 through the web 18 is a two-piece rod clamp 28. The two pieces of the clamp have their adjacent portions concavely curved to seat on the spindle and are adjustably spaced and held relative to one another by means of the adjusting screw 32 extending longitudinally through the rod. Thus, by tightening the screw and drawing the two pieces of the clamp 28 toward one another, the spindle 30 is clamped securely to the web 18.

The two parallel arms 20 of the support 12 comprise oppositely opening split sleeves or collars having longitudinal bores 34 therethrough. Furcations 36 forming the split portion of each clamp 20 are connected to one another through the medium of set screws 38. Obviously, by tightening or loosening the screws 38 to draw the furcations toward one another or allow them to spread apart from one another, the effective size of each bore 34 is readily controlled. The split sleeves open on opposite sides to reduce the possibility of screws 38 loosening when the holder is in use.

Each of the tool holding blocks 16 is notched as at 40 to provide two spaced parallel ears 42 and 44, respectively, with the end wall of the ear 42 being bevelled relative to the end wall of the ear 44 for ease of insertion into and removal from the notch 40 of a knurling tool. A mounting shaft 46 is provided for each block 16, this shaft extending perpendicularly from the outer surface of the ear 44 of each block for reception in an associated bore 34 of the clamping arm 20 of the support 12.

Ear 44 of each block 16 is provided with a blind bore 48 opening into the inner surface thereof facing the surface of ear 42, this blind bore being in radially offset relation to the axis of the mounting shaft 46 for the block. The ear 42 of each block 16 is provided with a bore 50 extending therethrough in alignment and registry with the blind bore 48 of the ear 44. A knurling tool carrying spindle 52 is slipped through the bore 50 and across the notch 40 to seat in the blind bore 48 whereby a knurling tool or wheel 54, having a bore 55 and carried thereby, may be disposed within the notch 40.

To maintain the knurling tool carrying spindle 52 in place, each block 16 is provided with a bore 56 therethrough which opens into the bore 50 of the ear 42 thereof. The lower portion of the bore 56 is threaded as at 58 and set screw 60 extending through the bore and threaded through the threaded portion 58 of the bore 56 has the end thereof in engagement with the tool carrying spindle 52 to fixedly retain the same on the block. Obviously, it is a simple matter to remove the spindle and change knurling tools as desired.

However, the unique operation of the knurling tool holder is achieved through the radially offset relation of the tool carrying spindle bores 48 and 50 to the tool block mounting shaft. Thus, after the tool blocks 16 are mounted within the tool support bores 34, any rotation of the shafts 46 within the bores 34 cause the tool carrying spindles of the opposing tool blocks 16 to move toward and away from one another in accordance with the direction of rotation thereby varying the spacing between the knurling tools 54. When the desired spacing of the tools is reached relative to a work piece, the clamping fasteners 38 of the split clamps 20 are tightened down to prevent further rotation of the tool block mounting shafts 46.

With the foregoing arrangement, an effective, simple and easily manipulated manner of changing the relative position of the knurling tools to adjust for varying sized work pieces is provided in a relatively inexpensive, durable and easily mounted attachment. By virtue of the direct, individual clamping action of the split collars on each of the tool block mounting shafts, no direct threaded connections are involved in maintaining the blocks in working position. This greatly enhances the rigidity of the tool blocks 16 relative to the work piece being knurled since they are held fixed by the clamping action of the collars formed by the arms 20 of the support rather than through any direct threaded connections. Further, each knurling tool block 16 is individually adjustable and set so that the depth of the knurl can be maintained constant even if the work piece is off center relative to the knurling tool support arms 20.

Although a certain specific embodiment of the invention has been shown and described, it is obvious that many modifications thereof are possible. The invention, therefore, is not to be restricted except insofar as is necessitated by the prior art and by the spirit of the appended claims.

What I claim is:

1. A knurling tool comprising a mounting shank, a tool support on said mounting shank and having a pair of arms projecting therefrom equally spaced radially away from the shank, longitudinal bores in said arms equally spaced diametrically relative to said shank, a pair of tool holding blocks each having a shaft extending perpendicularly therefrom and rotatably journaled in one of said bores, said blocks each including a pair of spaced parallel ears having aligned bearing seats therein with the axis of said seats parallel to and in radial offset relation to the associated shaft, a spindle mounted in said bearing seats and bridging the space between said ears, a knurling wheel journaled on said spindle between said ears, and clamping means releasably securing said shafts in selected angular position in said bores and fixing said tool holding blocks in nonrotative relation to said tool support with said blocks extending in opposite directions relative to each other and to said tool support and on opposite sides of the axis of said shank with said knurling wheels in diametrically and diagonally opposite relation to a workpiece positioned therebetween regardless of the diameter of the workpiece and with the axes of said spindles coplanar with the axis of the workpiece.

2. A knurling tool comprising a mounting shank, a tool support on said mounting shank and having spaced parallel oppositely opening split arms projecting therefrom, longitudinal bores in said arms diagonally and radially offset away from said shank, a pair of tool holding blocks each having a shaft extending perpendicularly therefrom and rotatably journaled in one of said bores, said blocks each including a pair of spaced parallel ears having aligned bearing seats therein with the axis of said seats parallel to and in radial offset relation to the associated shaft, a spindle removably mounted in said bearing seats and bridging the space between said ears, a knurling wheel removably journaled on said spindle between said ears, means on said block for releasably clamping said spindle in said bearing seats, and means clamping said split arms for releasably securing said shafts in selected angular position in said bores and fixing said tool holding blocks in nonrotative relation to said tool support with said blocks extending in opposite directions relative to each other and to said tool support and on opposite sides of the axis of said shank with said knurling wheels in diametrically and diagonally opposite relation to a workpiece positioned therebetween regardless of the diameter of the workpiece and with the axes of said spindles coplanar with the axis of the workpiece.

References Cited in the file of this patent

UNITED STATES PATENTS

| 2,436,975 | Ross | Mar. 2, 1948 |
| 2,579,611 | Poorman | Dec. 25, 1951 |
| 2,590,593 | Wittman | Mar. 25, 1952 |